United States Patent
Campbell

(10) Patent No.: US 6,886,090 B1
(45) Date of Patent: Apr. 26, 2005

(54) METHOD AND APPARATUS FOR VIRTUAL ADDRESS TRANSLATION

(75) Inventor: Paul W. Campbell, Oakland, CA (US)

(73) Assignee: ATI International SRL, Christchurch (BB)

( * ) Notice: Subject to any disclaimer, the term of this patent is extended or adjusted under 35 U.S.C. 154(b) by 0 days.

(21) Appl. No.: 09/352,959

(22) Filed: Jul. 14, 1999

(51) Int. Cl.$^7$ .............................................. G06F 12/00
(52) U.S. Cl. ...................... 711/206; 711/153; 711/202; 711/203; 345/568
(58) Field of Search ................................ 711/153, 163, 711/173, 202, 205–207, 203; 345/557, 561, 564–566, 568

(56) References Cited

U.S. PATENT DOCUMENTS

| | | | | |
|---|---|---|---|---|
| 5,664,139 | A | * | 9/1997 | Spurlock ..................... 711/202 |
| 6,192,455 | B1 | * | 2/2001 | Bogin et al. ................. 711/154 |
| 6,199,151 | B1 | * | 3/2001 | Williams et al. ............ 711/203 |
| 6,304,944 | B1 | * | 10/2001 | Pedneau ..................... 711/139 |
| 6,308,248 | B1 | * | 10/2001 | Welker et al. .............. 711/209 |
| 6,356,989 | B1 | * | 3/2002 | Hays et al. .................. 711/205 |
| 6,433,782 | B1 | * | 8/2002 | Nakatsuka et al. ......... 345/426 |

* cited by examiner

Primary Examiner—Pierre M. Vital

(74) Attorney, Agent, or Firm—Vedder, Price, Kaufman & Kammholz, P.C.

(57) ABSTRACT

A method and apparatus for virtual address translation include processing that begins by receiving a memory access request that includes a virtual address. The processing continues by determining whether a physical address translation has been performed for the virtual address. Note that a physical address translation translates the virtual address into an address. The address either corresponds to physical address of memory or is further translated into another physical address of memory. The processing continues when the address, which resulted from the physical address translation or the another physical address translation, is stored in a translation look aside table (TLB). When the physical address translation or the another physical address translation has not been performed, the processing retrieves a physical page address based on a portion of the virtual address. The processing continues by determining whether the physical page address corresponds to a physical address requiring further translation (e.g., is within the AGP window). If not, the physical page address and a portion of the virtual address are used to produce the physical address. If the address is within the physical address requiring further translation, a second physical page address is retrieved. Utilizing the second physical page address and a portion of the virtual address, another physical address is produced. Both the translations (i.e., the physical address and the another physical address) are stored within the same TLB of the central processing unit.

14 Claims, 5 Drawing Sheets

FIG. 5

METHOD AND APPARATUS FOR VIRTUAL ADDRESS TRANSLATION

TECHNICAL FIELD OF THE INVENTION

This invention relates generally to computer architectures and more particularly to virtual, or linear, address translations.

BACKGROUND OF THE INVENTION

FIG. 1 illustrates a schematic block diagram of a portion of a computer system. As shown, a central processing unit is coupled to cache memory and to a north bridge. The north bridge is coupled to memory, an accelerated graphics port (AGP) bus, and a peripheral component interconnect (PCI) bus. The central processing unit address memory in system virtual address space, or linear address space. To communicate with the north bridge, the central processing unit converts addresses in virtual address space to addresses in physical address space. To make such a conversion, the central processing unit often utilizes page address translation and includes a translation look-aside table (TLB) for storing the conversions.

The north bridge, upon receiving an address in physical address space from the central processing unit, determines whether the address corresponds to memory, PCI address space, or AGP memory space. If the address is directed towards the AGP address space, the north bridge makes a further translation of the received physical address utilizing a graphics address relocation table (GART) translation. The translated address is then stored in a GART TLB. As such, for the central processing unit to communicate with the AGP bus, two address space translations occur utilizing separate paging, page address translations and two separate TLBs are maintained.

FIG. 2 illustrates a graphical representation of address space within the system of FIG. 1. As shown, the system virtual address space, which corresponds to the central processing unit, has memory space for input/output transactions, kernels and processes. The system virtual addresses are converted to physical addresses as previously discussed. The physical address space includes PCI address space, AGP address space, main memory address space, and DOS address space. The main memory address space corresponds to the DRAM address space, while the PCI address space corresponds to the PCI address space along the PCI bus. As shown, for the AGP address space needs to be converted through a GART translation and is stored in main memory. Hence the need for the extra conversion.

FIG. 3 illustrates a logic diagram of a method for address translations. The process begins with the central processing unit determining whether an address has a corresponding translation in its TLB. If not, the CPU indexes, based on a portion of the linear address, a page directory to obtain a page directory entry (PDE). The central processing unit then indexes a page table based on the PDE and another portion of the linear address to obtain a page table entry (PTE). At this point, the central processing unit obtains the physical address based on the page table entry and yet another portion of the virtual, or linear, address. In a typical 32 bit virtual address, the first ten bits are used to address the page directory, the next ten bits are used to address the page table and the remaining bits correspond the least significant bits of the physical address. Note that if the translation has been stored in the TLB, the central processing unit may retrieve the physical address directly from the TLB.

Having obtained the physical address, the central processing unit determines whether the data is cached. If so, the process is done for this particular address. If not, the central processing unit passes the physical address to the north bridge. Upon receiving the physical address, the north bridge determines whether the physical address is in the AGP window. If not, the north bridge causes the corresponding data to be read from memory and sent to the central processing unit. If, however, the physical address is in the AGP window, the north bridge determines whether an AGP translated address is stored in a GART TLB. If so, the translated address is used to retrieve data from memory, which data is subsequently provided to the central processing unit. If, however, a GART TLB entry is not stored, the north bridge performs an AGP translation using a GART table.

As such when addresses produced by the central processing unit correspond to the AGP window, two translations occur. In existing computer systems, the two translations are done by the central processing unit and the north bridge. As such, each device contains a separate TLB. Such redundancy adds extra processing steps to address translations and produces overlapping data storage. In addition, it is more difficult to cache data from memory within the AGP window because the second address translation occurs within the north bridge.

Therefore, a need exists for a method and apparatus that more efficiently performs virtual address translations.

DETAILED DESCRIPTION OF A PREFERRED EMBODIMENT

Generally, the present invention provides a method and apparatus for virtual address translation. Such a method and apparatus include processing that begins by receiving a memory access request that includes a virtual address. The processing continues by determining whether a physical address translation has been performed for the virtual address. Note that a physical address translation translates the virtual address (often referred to as a linear address) into an address. The address either corresponds to physical address of memory or is further translated into another physical address of memory. The processing continues when the address, which resulted from the physical address translation or the another physical address translation, is stored in a translation look aside table (TLB). When the physical address translation or the another physical address translation has not been performed, the processing retrieves a physical page address based on a portion of the virtual address. The processing continues by determining whether the physical page address corresponds to a physical address requiring further translation (e.g., is within the AGP window). If not, the physical page address and a portion of the virtual address are used to produce the physical address. If the address is within the physical address requiring further translation, a second physical page address is retrieved. Utilizing the second physical page address and a portion of the virtual address, another physical address is produced. Both types of translations (i.e., the physical address and the another physical address) are stored within the same TLB of the central processing unit. With such a method and apparatus, address translations into and from the AGP window are performed with less operational instructions, are performed within the CPU, are performed without redundant or separate TLBs, and allows for ease in caching data from memory within the AGP window.

Figure 1:
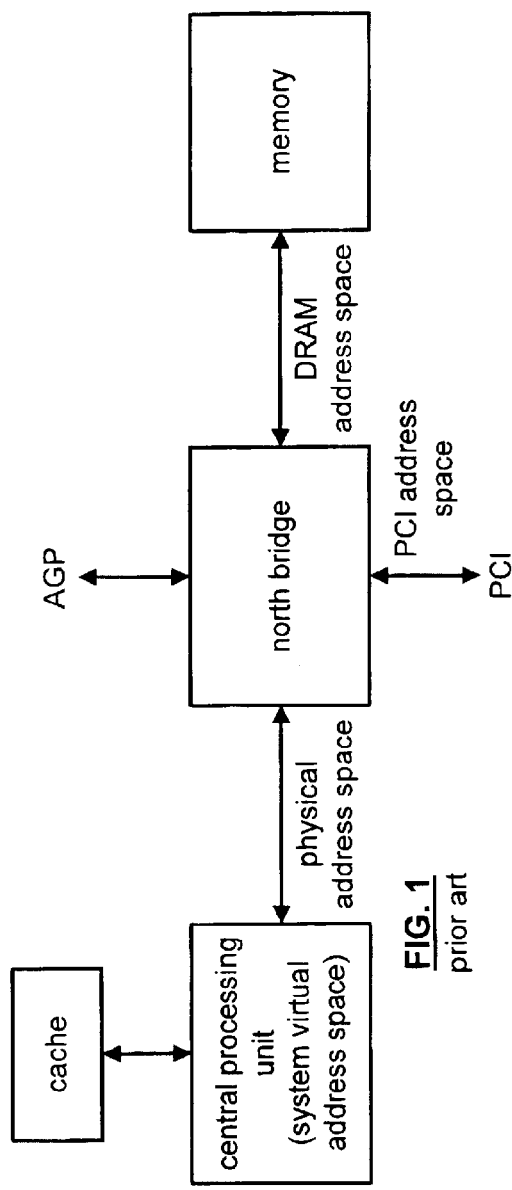
FIG. 1 illustrates a schematic block diagram of a portion of a prior art computing system.
Figure 2:
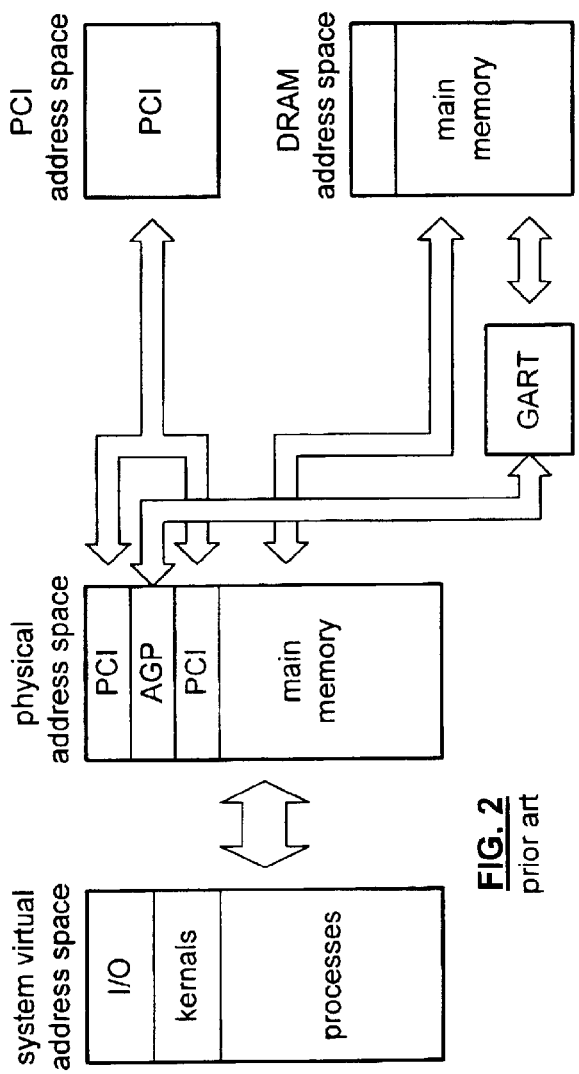
FIG. 2 illustrates a graphic representation of address space in a prior art computing system.
Figure 3:
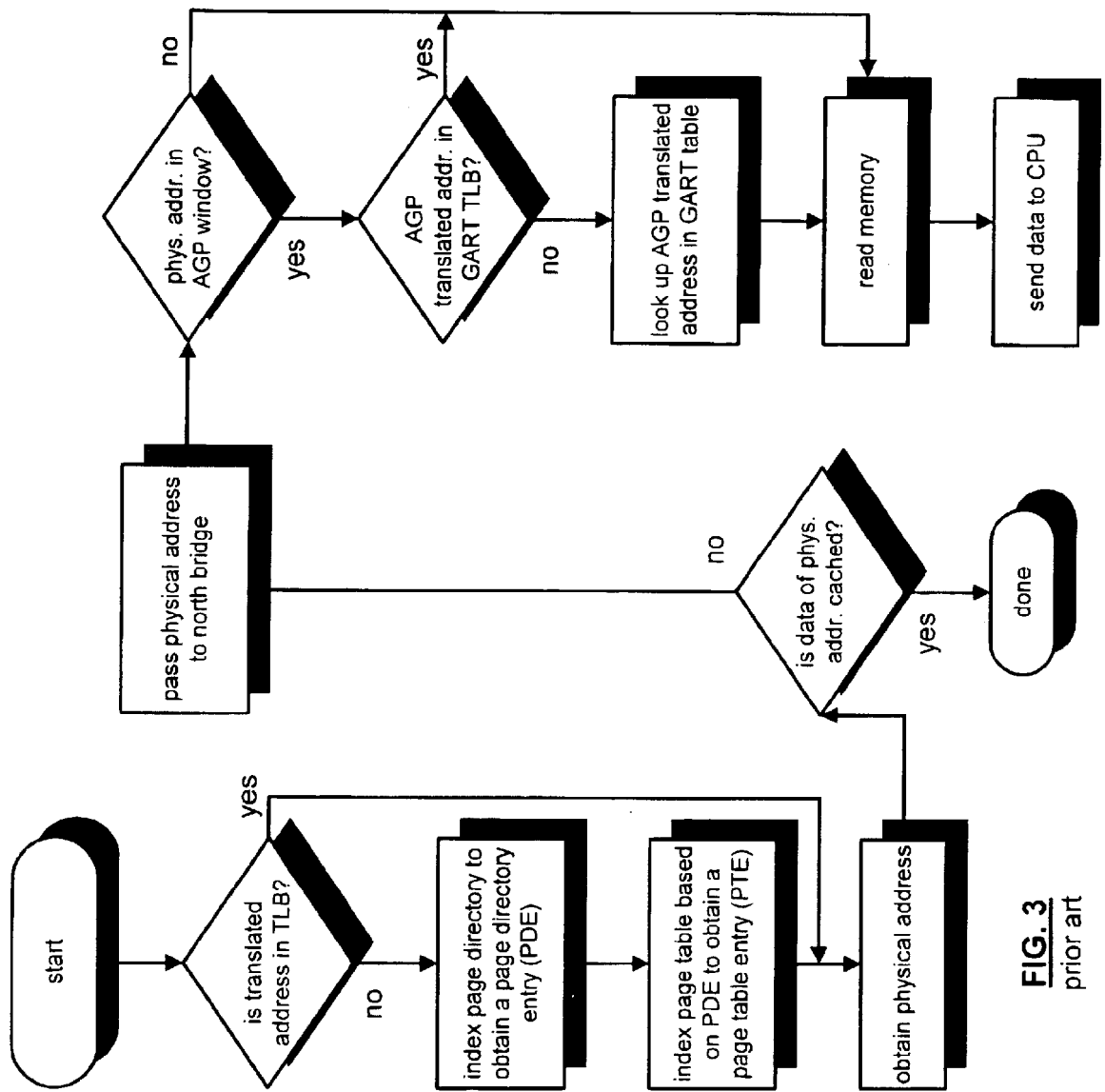
FIG. 3 illustrates a logic diagram of a method for address space conversion in a prior art computing system.
Figure 4:
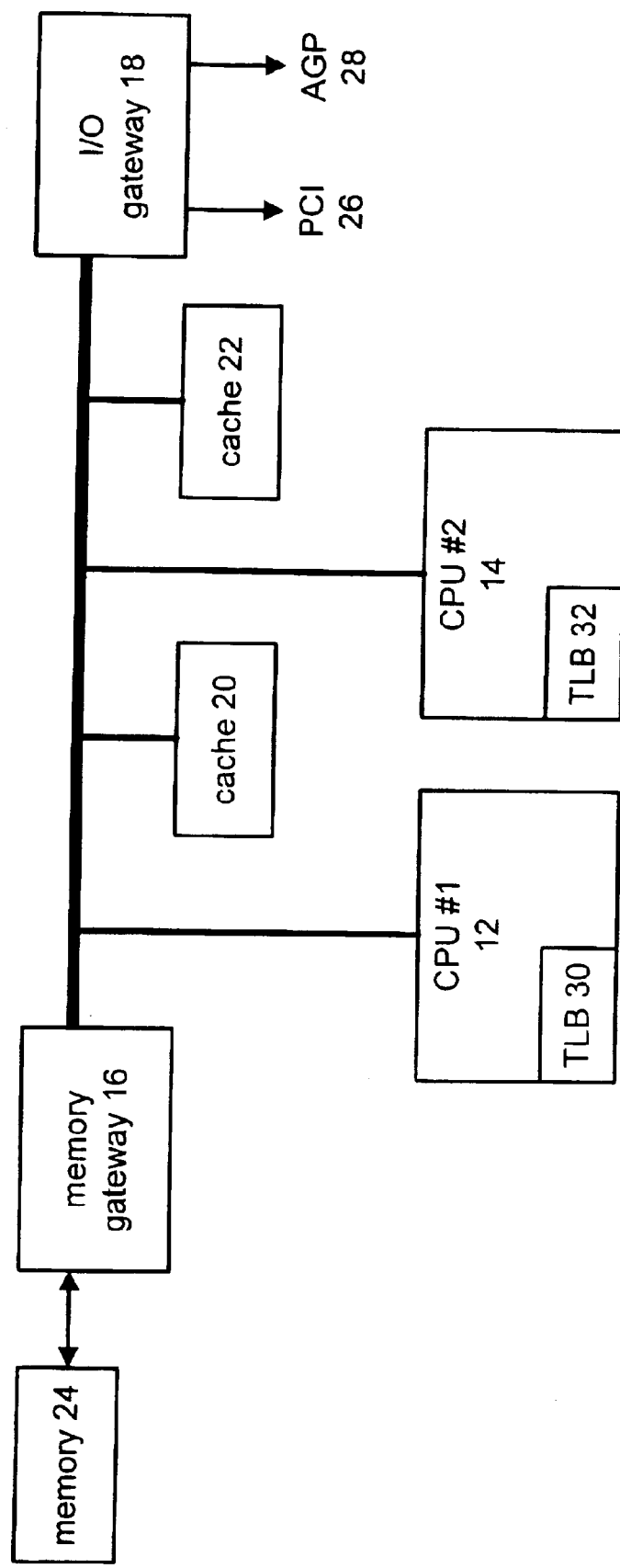
FIG. 4 illustrates a schematic block diagram of a computing system in accordance with the present invention.

The present invention can be more fully described with reference to FIGS. 4–6. FIG. 4 illustrates a schematic block diagram of a computing system 10 that includes a pair of central processing units 12 and 14, a memory gateway 16, an I/O (input/output) gateway 18, cache memory 20 and 22, and memory 24. Each of the central processing units includes a separate translation look aside table (TLB) 30 and 32. The central processing units 12 and 14, the memory gateway 16, the 10 gateway 18 and the cache memories 20 and 22 are operably coupled to a global bus such that all memory access requests on the bus are done utilizing the same address space. Typically, the address space will be the physical address space but could be a virtual address space. Note that the I/O gateway 18 provides coupling to the PCI bus 26 and to the AGP bus 28. As such, the I/O gateway 18 performs the address space translation from PCI space to the address space used on the global bus. In addition, the I/O gateway 18 enables data to be read and/or written over the AGP bus, however, the AGP address translation is done within the CPU as described herein. The memory gateway 16 performs the address translation from the address space on the bus to physical address space.

Figure 5:
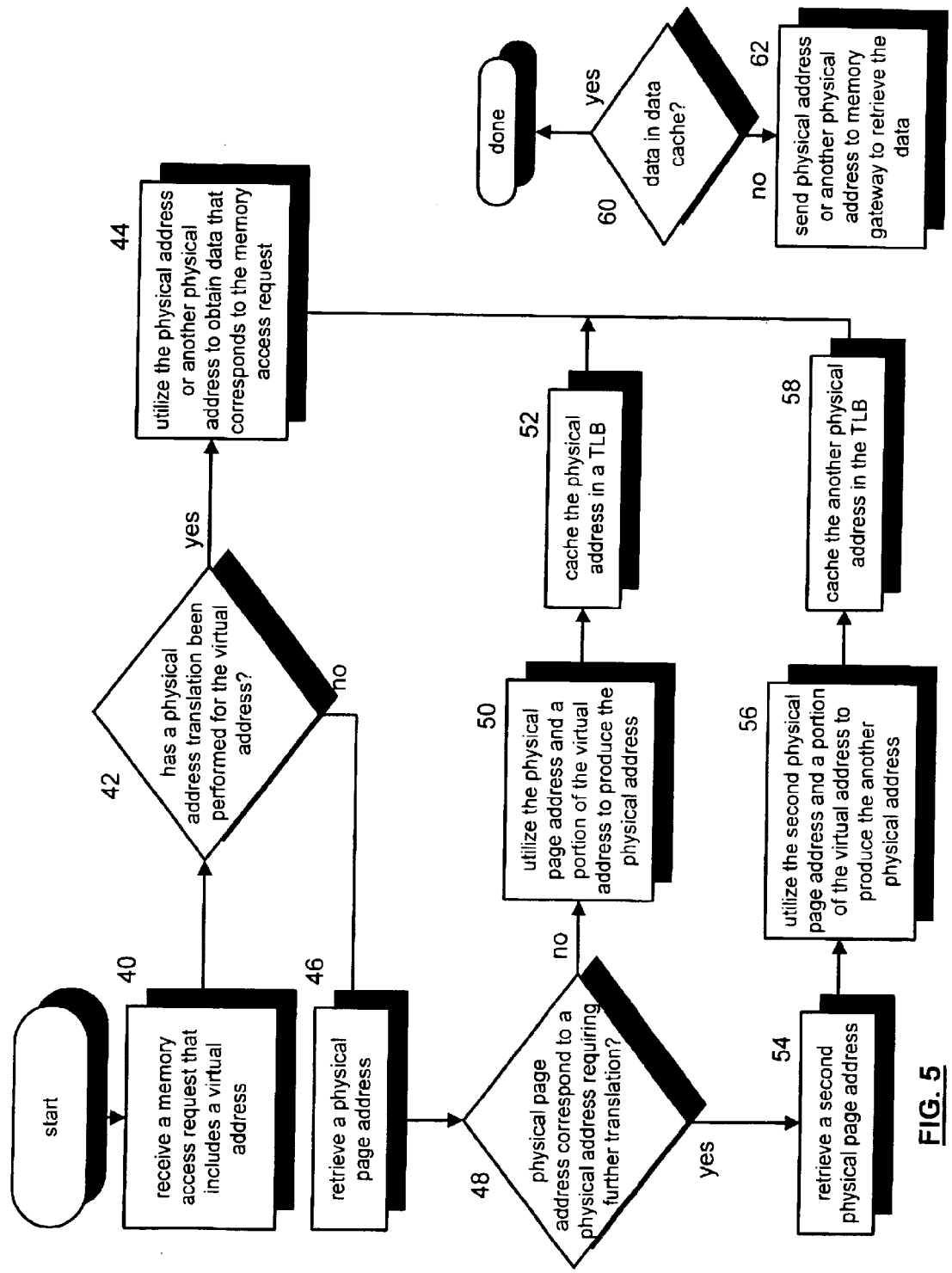
FIG. 5 illustrates a logic diagram of a method for address space translation in accordance with the present invention.
Figure 6:
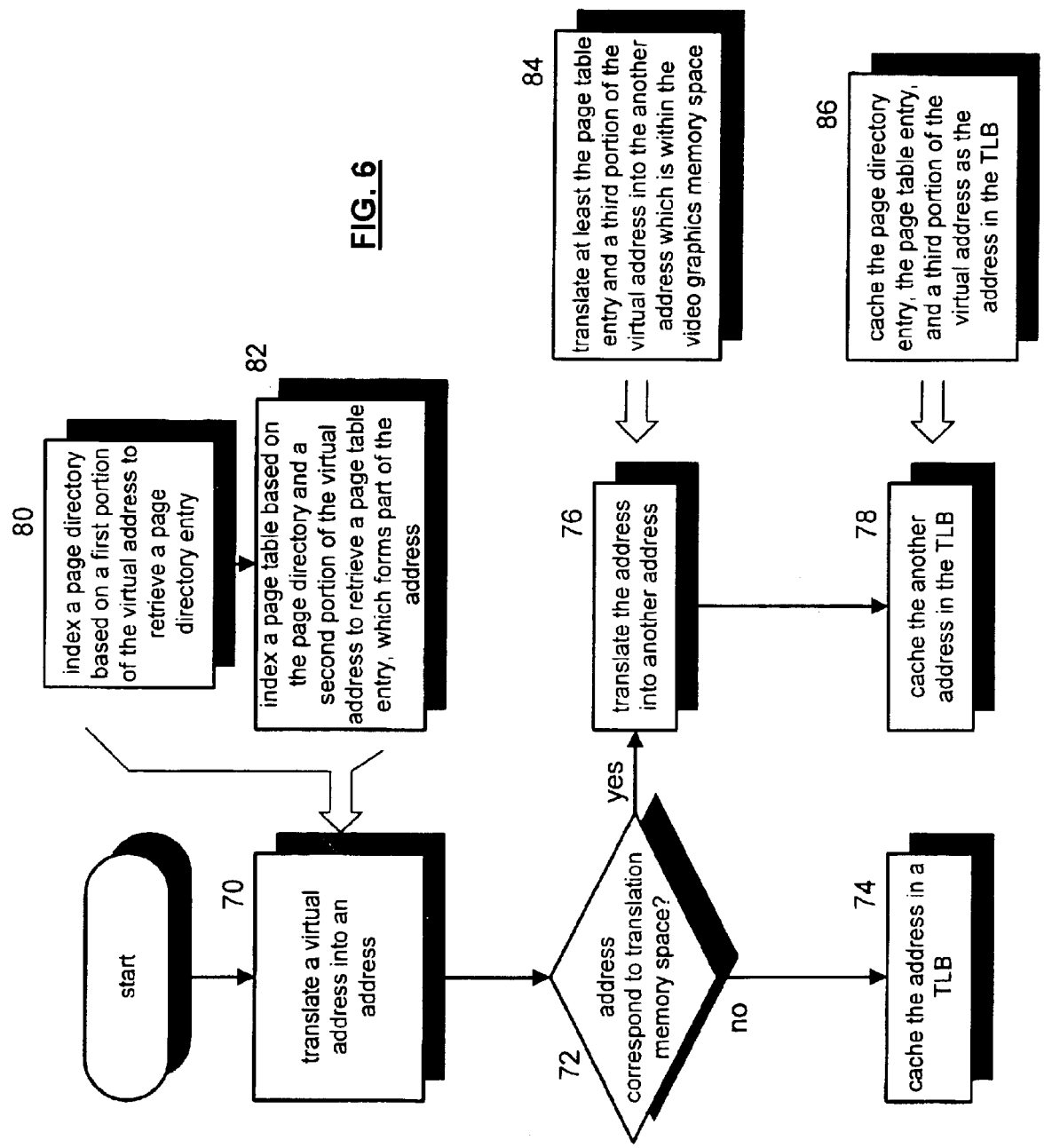
FIG. 6 illustrates a logic diagram of a method for generating a translation look aside table entry in accordance with the present invention.

To facilitate address space conversions, the central processing units 12 and 14 utilize their respective TLBs 30 and 32 to perform the methods shown in FIGS. 5 and 6. The processing of FIG. 5 begins at step 40 where a memory access request is received, wherein the memory access request includes a virtual address (a.k.a., a linear address). The process then proceeds to step 42 where a determination is made as to whether a physical address translation has been performed for a virtual address. In one embodiment, the central processing unit processing this particular memory request by accessing its TLB and determining whether an entry exists for this particular virtual address. If so, the process proceeds to step 44 where the physical address or another physical address is used to obtain data which corresponds to the memory access requests. The physical address corresponds to a single translation of the virtual address while another physical address corresponds to the virtual address undergoing two translations wherein the another physical address corresponds to the AGP window of main memory.

If a physical address translation has not been performed for the virtual address, the process proceeds to step 46. At step 46 a physical page address is retrieved. The physical page address is retrieved utilizing a first portion of the virtual address via known paging techniques involving page directories and page tables. The process then proceeds to step 48 where a determination is made as to whether the physical page address corresponds to a physical address requiring further translation. In one embodiment, the determination at step 48 is determining whether the physical address corresponds to the AGP window. As one of average skill in the art would appreciate, other portions of the main memory may be reserved for other applications, which would require a further translation similar to addresses corresponding to the AGP window.

If the physical page address does not correspond to a physical address requiring further translation, the process proceeds to step 50. At step 50, the physical page address and a portion of the virtual address are used to produce the physical address. The process then proceeds to step 52 where the physical address, the physical page address, and/or the portion of the virtual address are stored in the CPUs translation look aside table. The process then proceeds to step 44 where the TLB entry is accessed to retrieve the corresponding physical address such that the appropriate data is obtained.

If, however, the physical page address does correspond to a physical address requiring further translation, the process proceeds to step 54. At step 54, a second physical page address is retrieved utilizing the first portion of the physical address requiring further translation via known paging techniques involving page directories and page tables. This second physical page address may correspond to AGP window space and may be the equivalent of an entry in a GART table. The process then proceeds to step 56 where the second physical page address and a portion of the virtual address are used to produce another physical address. The process then proceeds to step 58 where another physical address, the second physical page address, and/or a portion of the virtual address are stored in the CPUs TLB. The TLB is then accessed to retrieve the another physical address such that the corresponding data may be obtained at step 44.

The obtaining of data at step 44 may be further described with steps 60 and 62. At step 60, a determination is made as to whether the data is cached. If so, the data is retrieved and the process is done. If not, the process proceeds to step 62 where the physical address or the another physical address is provided to the memory gateway to retrieve the requested data.

FIG. 6 illustrates a logic diagram for generating translation look aside table entries in accordance with the present invention. Such processing begins at step 70 where a virtual address is translated into an address. This may be performed in accordance with steps 80 and 82. At step 80, a page directory is indexed based on a first portion of the virtual address to retrieve a page directory entry. The process then proceeds to step 82 where a page table is indexed based on the page directory and a second portion of the virtual address to retrieve a page table entry, which forms part of the address.

Returning to the main flow, the process proceeds to step 72 where a determination is made as to whether the address corresponds to translation memory space. One such translation memory space may be the AGP window, but could be any addressing that is further translated from the physical memory address. If not, the process proceeds to step 74 where the address, the page table entry, and the portion of the virtual address are stored in the translation look aside table.

If the address does correspond to a translation memory space, the process proceeds to step 76. At step 76 the address is translated into another address. This may be further described in accordance with step 84 where at least the page table entry and a third portion of the virtual address are translated into the another address which is within the video graphics memory space. Returning to the main flow, the process proceeds to step 78 where the another address is cached in the TLB. As such the address and the another address paging translations are stored within the same TLB of the central processing unit. The caching of addresses within the TLB may be further defined with reference to step 86. At step 86 the page directory entry, the page table entry, and the third portion of the virtual address are cached as the address in the TLB.

The preceding discussion has presented a method and apparatus for virtual address translations. With such a method and apparatus, the central processing unit can perform both physical address translations and physical address translations into the AGP window space without the need for the north bridge. As such, a single TLB may be utilized to perform such address translations thereby reducing the complexity, redundancy, and extra processing required in previous computer architectures. In addition, the single TLB processing allows for ease in caching data from memory within the AGP window.

What is claimed is:

1. A method for virtual address translation, the method comprises the steps of:

receiving a memory access request that includes a virtual address;

determining whether a physical address translation has been performed for the virtual address, wherein the physical address translation translates the virtual address to an address, wherein the address is a physical address of a memory or is further translated to obtain another physical address of the memory;

when the physical address translation or the another physical address translation has been performed for the virtual address, utilizing the physical address or the another physical address to obtain data corresponding to the memory access request;

when a physical address translation has not been performed for the virtual address, retrieving a physical page address based on at least a portion of the virtual address;

determining whether the physical page address corresponds to a physical address requiring further translation;

when the physical page address does not correspond to a physical address that requires further translation, utilizing the physical page address and a portion of the virtual address to produce the physical address;

caching the physical address in a translational look aside table;

when the physical page address corresponds to a physical address that requires further translation, retrieving a second physical page address;

utilizing the second physical page address and a portion of the virtual address to produce the another physical address; and caching the another physical address in the translation look aside table.

2. The method of claim 1 further comprises when data corresponding to the memory access request is cached, utilizing the data.

3. A method for virtual address translation, the method comprises the steps of:

a) translating a virtual address into an address;

b) determining whether the address corresponds to a translation memory space;

c) caching the address in a translation look aside table when the address does not correspond the translation memory space;

d) translating the address into another address when the address corresponds to the translation memory space; and e) caching the another address in the translation look aside table.

4. The method of claim 3, wherein step (a) further comprises:

indexing a page directory based on a first portion of the virtual address to retrieve a page directory entry; and indexing a page table based on the page directory and a second portion of the virtual address to retrieve a page table entry as at least part of the address.

5. The method of claim 4, wherein (b) further comprises determining whether the page table entry is in video graphics memory space.

6. The method of claim 5, wherein step (c) further comprises caching the page directory entry, the page table entry, and a third portion of the virtual address as the address.

7. The method of claim 4, wherein step (d) further comprises translating at least the page table entry and a third portion of the virtual address into an address within the video graphics memory space.

8. A virtual address translation module comprises:

a processing module; and memory operably coupled to the processing module, wherein the memory stores operational instructions that cause the processing module to receive a memory access request the includes a virtual address; determine whether a physical address translation has been performed for the virtual address, wherein the physical address translation translates the virtual address to an address, wherein the address is a physical address of the memory or is further translated to obtain another physical address of the memory, utilize the physical address or the another physical address to obtain data corresponding to the memory access request when the physical address translation or the another physical address translation has been performed for the virtual address; retrieve a physical page address based on at least a portion of the virtual address when a physical address translation has not been performed for the virtual address; determine whether the physical page address corresponds to a physical address requiring further translation; utilize the physical page address and a portion of the virtual address to produce the physical address when the physical page address does not correspond to a physical address that requires further translation; cache the physical address in a translation look aside table; retrieve a second physical page address when the physical page address corresponds to a physical address that requires further translation; utilize the second physical page address and a portion of the virtual address to produce the another physical address; and cache the another physical address in the translation look aside table.

9. The virtual address translation module of claim 8, wherein the memory further comprises operational instructions that cause the processing module to utilizing the data when data corresponding to the memory access request is cached.

10. A virtual address translation module comprises:

a processing module; and memory operably coupled to the processing module, wherein the memory stores operational instructions that cause the processing module to: (a) translate a virtual address into an address; (b) determine whether the address corresponds to a translation memory space; (c) cache the address in a translation look aside table when the address does not correspond to the translation memory space; (d) translate the address into another address when the address corresponds to the translation memory space; and (c) cache the another address in the translation look aside table.

11. The virtual address translation module of claim 10, wherein the memory further comprises operational instructions that cause the processing module to translate the virtual address by:

indexing a page directory based on a first portion of the virtual address to retrieve a page directory entry; and indexing a page table based on the page directory and a second portion of the virtual address to retrieve a page table entry as at least part of the address.

12. The virtual address translation module of claim 11, wherein the memory further comprises operational instructions that cause the processing module to determine whether the page table entry is in video graphics memory space.

13. The virtual address translation module of claim 12, wherein the memory further comprises operational instructions that cause the processing module to cache the page directory entry; the page table entry; and a third portion of the virtual address as the address.

14. The virtual address translation module of claim 13, wherein the memory further comprises operational instructions that cause the processing module to translate at least the page table entry and a third portion of the virtual address into an address within the video graphics memory space.

* * * * *